(12) United States Patent
Huh (10) Patent No.: US 9,078,187 B2
(45) Date of Patent: Jul. 7, 2015

(54) SYSTEM AND METHOD FOR HANDOFF BETWEEN DIFFERENT TYPES OF NETWORKS

(75) Inventor: Jun Huh, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 451 days.

(21) Appl. No.: 13/171,907

(22) Filed: Jun. 29, 2011

(65) Prior Publication Data

US 2012/0002638 A1  Jan. 5, 2012

(30) Foreign Application Priority Data

Jun. 30, 2010 (KR) ........................ 10-2010-0063037

(51) Int. Cl.
*H04W 36/00* (2009.01)
*H04W 36/14* (2009.01)
*H04W 36/16* (2009.01)
*H04W 88/06* (2009.01)

(52) U.S. Cl.
CPC .............. *H04W 36/14* (2013.01); *H04W 36/16* (2013.01); *H04W 88/06* (2013.01)

(58) Field of Classification Search
CPC ...... H04W 36/14; H04W 36/16; H04W 88/06
USPC .................. 370/310, 328, 329, 331
See application file for complete search history.

(56) References Cited

U.S. PATENT DOCUMENTS

| | | | |
|---|---|---|---|
| 7,369,549 B2 * | 5/2008 | Wu et al. .................... 370/389 |
| 7,894,400 B2 * | 2/2011 | Rahman et al. ............. 370/331 |
| 7,899,458 B2 * | 3/2011 | Kakishima et al. .......... 455/436 |
| 7,970,399 B2 * | 6/2011 | Sunderberg et al. ......... 455/436 |
| 8,130,716 B2 * | 3/2012 | Abe et al. .................... 370/330 |
| 8,149,790 B2 * | 4/2012 | Purkayastha et al. ........ 370/332 |
| 8,165,091 B2 * | 4/2012 | Nix .............................. 370/331 |
| 8,179,839 B2 * | 5/2012 | Marinier et al. ............. 370/328 |
| 8,200,215 B2 * | 6/2012 | Schliwa-Bertling et al. ..................... 455/432.2 |
| 8,208,516 B2 * | 6/2012 | Meylan et al. ............... 375/219 |
| 8,331,315 B2 * | 12/2012 | Purkayastha et al. ........ 370/331 |
| 2003/0114158 A1 * | 6/2003 | Soderbacka et al. ......... 455/436 |
| 2004/0219918 A1 * | 11/2004 | Kakishima et al. .......... 455/436 |
| 2006/0111112 A1 * | 5/2006 | Maveddat .................... 455/439 |
| 2008/0140392 A1 * | 6/2008 | Kim ............................. 704/201 |
| 2009/0196241 A1 * | 8/2009 | Abe et al. .................... 370/329 |
| 2011/0194532 A1 * | 8/2011 | Kakkad ........................ 370/331 |

\* cited by examiner

*Primary Examiner* — Chi H Pham
*Assistant Examiner* — Robert Lopata
(74) *Attorney, Agent, or Firm* — IP Legal Services, LLC (57) ABSTRACT

System and method for handoff between different types of networks. A communication session of a user equipment may be handed off from a first network to a second network based on a network condition of the first network. A network information may be transmitted from the first network and the network condition of the first network may be determined based on received network information. The network information may include information of an adaptive multi-rate (AMR) mode assigned for providing a corresponding service, and the information of the AMR mode may be assigned based on the network condition of the first network and may be associated with a bit-rate for speech coding. A handoff from the first network to the second network may be initiated when the network condition of the first network is determined to be poor.

19 Claims, 6 Drawing Sheets

| Information Element/Group name | Need | Multi | Type and reference | Semantics description |
|---|---|---|---|---|
| Message Type | MP | | Message Type | |
| UE information elements | | | | |
| RRC transaction identifier | MP | | RRC transaction identifier 10.3.3.36 | |
| Integrity check info | CH | | Integrity check info 10.3.3.16 | |
| TrCH information elements | | | | |
| CHOICE mode | MP | | | |
| >FDD | | | | (no data) |
| >TDD | | | | |
| >>TFCS Id | OP | | Transport Format Combination Set Identity 10.3.5.21 | |
| DPCH/PUSCH TFCS in uplink | MP | | Transport Format Combination subset 10.3.5.22 | |
| Activation time for TFC subset | MD | | Activation time 10.3.3.1 | Default value is "now" |
| TFC Control duration | OP | | TFC Control duration 10.3.6.80 | |

SYSTEM AND METHOD FOR HANDOFF BETWEEN DIFFERENT TYPES OF NETWORKS

CROSS REFERENCE TO PRIOR APPLICATIONS

The present application claims priority under 35 U.S.C. §119 to Korean Patent Application No. 10-2010-0063037 (filed on Jun. 30, 2010), which is hereby incorporated by reference in its entirety.

FIELD OF THE INVENTION

Apparatuses and methods consistent with the present invention relate to a handoff between different types of networks, and more particularly, to initiating a handoff from a first network to a second network based on a network condition of the first network.

BACKGROUND OF THE INVENTION

Lately, a multimode user equipment has become popular. The multimode user equipment is compatible with more than one type of communication service. Using such a multimode user equipment, a user can obtain different types of communication services such as a WCDMA service and a WiBro service with one device. In order to support multiple types of communication services, the multimode user equipment may include a plurality of modulator-demodulators (MODEMs).

When a multimode user equipment moves from one network to another, a handoff is performed to receive a service seamlessly. In order to perform such a seamless handoff, the related art has required all MODEMs in the multimode user equipment to be turned on. Such a requirement greatly increases the power consumption of the user equipment.

In order to overcome such a problem, some of the MODEMs may be turned off when the multimode user equipment is within a network area that the specific MODEMs are not related thereto. However, a user would be required to manually turn on a corresponding MODEM when a multimode user equipment enters a network area that is related thereto. In this case, a service may be interrupted when a user enters into a different type of network area. In order to overcome the above problems, there is a need for developing a method for automatically initiating a handoff from one network to another.

SUMMARY OF THE INVENTION

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, a handoff from a first network to a second network may be initiated based on network information that is regularly transmitted in the first network.

In accordance with another aspect of the present invention, an information of an adaptive multi-rate (AMR) mode may be extracted from a transport format combination (TFC) control message, and a bit-rate associated with the extracted information of the AMR mode may be used to evaluate a network condition. A handoff may be initiated based on the evaluation result.

In accordance with an embodiment of the present invention, a communication session of a user equipment may be handed off from a first network to a second network. A network information may be transmitted from the first network and received by another device such as a user equipment. A network condition of the first network may be determined based on the received network information. A handoff from the first network to the second network may be initiated when the network condition of the first network is determined to be poor. The network information may include information of an adaptive multi-rate (AMR) mode. The information of the AMR mode may be assigned based on the network condition of the first network and may be associated with a bit-rate for speech coding.

In order to determine the network condition, the information of the AMR mode may be extracted from the received network information, and a bit-rate associated with the assigned AMR mode may be ascertained from the extracted information of the AMR mode. The ascertained bit-rate may be compared with a threshold number, and the network condition of the first network may be determined to be poor when the ascertained bit-rate is lower than the threshold number. A bit-rate associated with the AMR mode may be one of 12.2K, 7.95K, 5.9K, and 4.75K, and the threshold number may be 4.75K.

In order to initiate the handoff from the first network to the second network, a processing module for the second network may be turned on, and an accessible base station of the second network may be searched for. The communication session may also be established with the second network, when the accessible base station is found, and the handoff from the first network to the second network may be performed. Furthermore, the processing module for the second network may be turned off when the searching for the accessible base station of the second network does not locate the accessible base station after a first number of attempts are made.

The first network may be a mobile network, and the second network may be a wireless data network. The network information may be transmitted, by a radio network controller of the first network, within a transport format combination (TFC) control message sent through a downlink (DL) dedicated control channel (DCCH). An adaptive multi-rate (AMR) mode, which is assigned based on the network condition of the mobile network and is associated with a bit-rate for speech coding, may be included in an Allowed Transport Formation Combination List field in a transport format combination (TFC) subset of a TFC control message.

In accordance with an embodiment of the present invention, a handoff from a mobile network to a wireless data network is performed. A service may be received in a communication session formed with the mobile network, and a transport format combination (TFC) control message may be received from the mobile network. An information of an adaptive multi-rate (AMR) mode may be extracted from the received TFC control message. A network condition of the mobile network may be determined based on the extracted information of the AMR mode, and a handoff from the mobile network to the wireless data network may be initiated when the network condition of the mobile network is determined to be poor. The AMR mode may be one of a plurality of AMR modes selectively assigned for providing the service based on the network condition of the mobile network, and each AMR mode may be associated with a different bit-rate for speech coding.

In order to determine the network condition, a bit-rate associated with the AMR mode may be ascertained from the extracted information of the AMR mode, and the ascertained bit-rate may be compared with a threshold number. The network condition of the mobile network may be determined to be poor when the ascertained bit-rate is lower than the threshold number. A bit-rate associated with the AMR mode may be one of 12.2K, 7.95K, 5.9K, and 4.75K, and the threshold number may be 4.75K.

In order to initiate the handoff from the mobile network to the wireless data network, a processing module for the wireless data network may be turned on, an accessible base station of the wireless data network may be searched for, the communication session with the wireless data network may be established when the accessible base station is found, and the handoff from the mobile network to the wireless data network may be performed. Furthermore, the processing module for the wireless data network may be turned off when the searching for the accessible base station of the wireless data network does not locate the accessible base station after a first number of attempts are made. The TFC control message may be transmitted, by a radio network controller of the mobile network, through a downlink (DL) dedicated control channel (DCCH). The AMR mode, which is assigned based on the network condition of the mobile network and is associated with a bit-rate for speech coding, may be included in an Allowed Transport Formation Combination List field in a TFC subset of the TFC control message.

In accordance with an embodiment of the present invention, a system may perform handoff based on network information. The system may include a mobile network and a user equipment. The mobile network may be configured to provide the network information through a common channel. The user equipment may be configured to determine a network condition of the mobile network based on the provided network information and initiate a handoff from the mobile network to a wireless data network when the network condition of the mobile network is determined to be poor. The network information may be transmitted to the user equipment within a transport format combination (TFC) control message and through a downlink (DL) dedicated control channel (DCCH), and the user equipment may extract an information of an adaptive multi-rate (AMR) mode associated with the mobile network from the TFC control message. The user equipment may compare a bit-rate associated with the AMR mode with a threshold number, and turn on a processing module for the wireless data network and perform the handoff from the mobile network to the wireless data network when the comparison results in the bit-rate being less than the threshold number. The comparison result of the bit-rate being less than the threshold number may indicate that the mobile network has a poor network condition.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Reference will now be made in detail to embodiments of the present invention, examples of which are illustrated in the accompanying drawings, wherein like reference numerals refer to like elements throughout. The embodiments are described below, in order to explain the present invention by referring to the figures.

Figure 1:
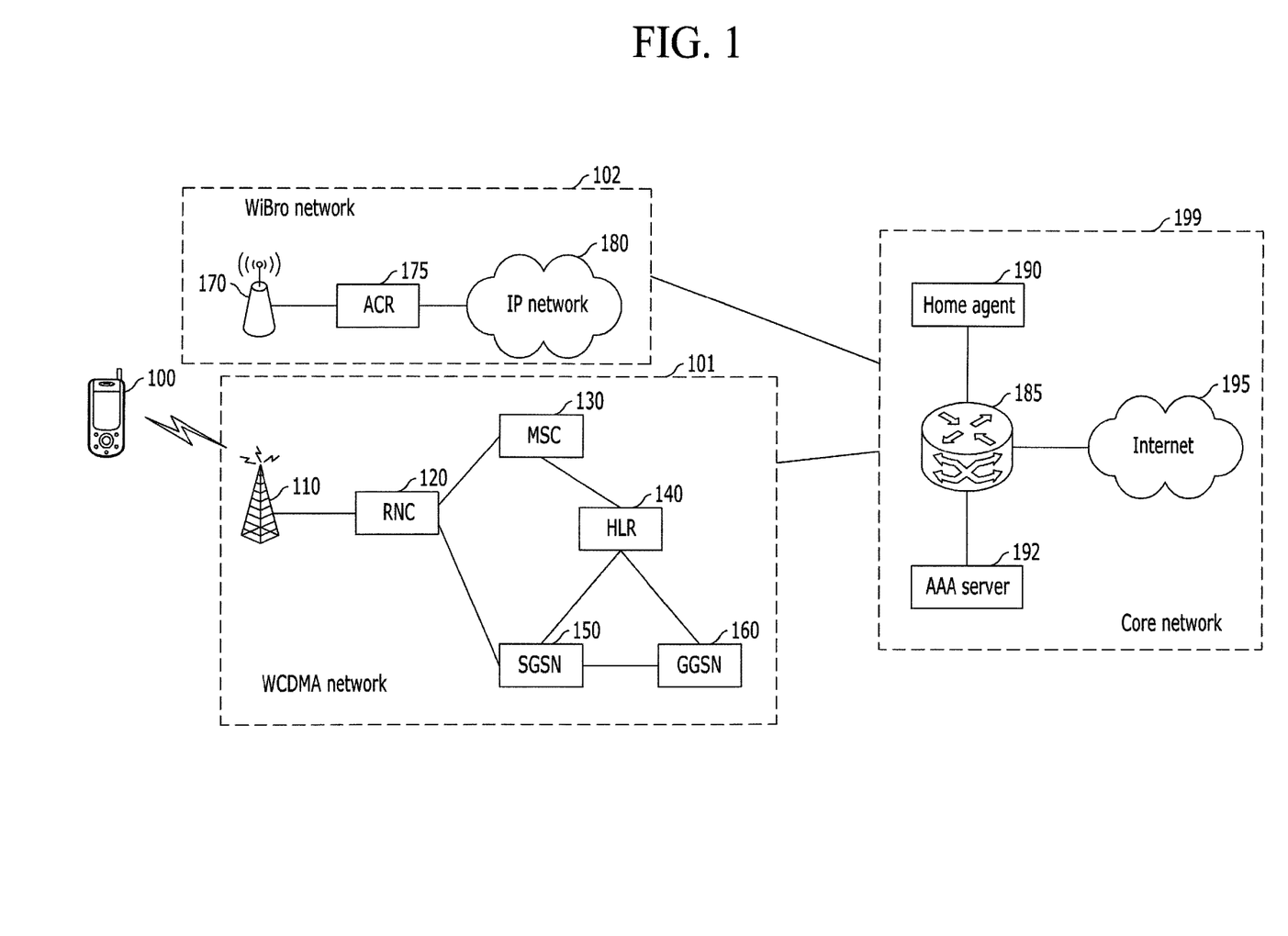
FIG. 1 illustrates a system for a handoff from a wideband code division multiple access (WCDMA) network to a wireless broadband (WiBro) network, in accordance with an embodiment of the present invention.

FIG. 1 illustrates a system for a handoff from a wideband code division multiple access (WCDMA) network to a wireless broadband (WiBro) network, in accordance with an embodiment of the present invention.

In accordance with an embodiment of the present invention, a system may initiate a handoff from a WCDMA network to a WiBro network based on a network condition of the WCDMA network. In order to evaluate the network condition in the WCDMA network, the system may obtain network information that is regularly transmitted through a common channel in the WCDMA network. When the obtained network information indicates that the network condition is comparatively poor, the system may automatically initiate a handoff from the WCDMA network to the WiBro network.

For convenience and ease of understanding, the handoff is representatively shown in FIG. 1 as being performed between a WCDMA network 101 and a WiBro network 102. The system illustrated in FIG. 1 has the particular configuration shown as an example only, and the present invention is not limited thereto. The WCDMA network 101 is an example of a mobile network as a first network and the WiBro network 102 is an example of a wireless data network as a second network. A system in accordance with an embodiment of the present invention may include a plurality of types of networks, so long as the user equipment 100 initially communicating with a first network of a first network type may be handed off to a second network of a second network type when the user equipment 100 enters the service area of the second network. The first network type and the second network type may each be any type of communication network or standard, so long as the first network type and the second network type are not the same.

Referring to FIG. 1, the system may include a user equipment 100, a WCDMA network 101, a WiBro network 102, and a core network 199. The core network 199 may include a router 185, a home agent 190, an authentication, authorization, and accounting (AAA) server 192, and an Internet 195.

The user equipment 100 may be a multi-mode multi-band heterogeneous network device capable of communicating with another party using networks such as the WCDMA network 101 and the WiBro network 102. The user equipment 100 may include a WCDMA modulator-demodulator (MODEM) and a WiBro MODEM. The user equipment 100 may receive a WCDMA service through the WCDMA MODEM within a WCDMA service area. The user equipment 100 may receive a WiBro service through the WiBro MODEM within a WiBro service area.

The user equipment 100 may receive the network information regularly transmitted in the WCDMA network 101. The user equipment 100 may evaluate a network condition of the WCDMA network 101 based on the received network information. The network information may include information of an adaptive multi-rate (AMR) mode assigned for providing a corresponding service. The user equipment 100 may determine the network condition of the WCDMA network 101 based on the assigned AMR mode indicated by the network information. The user equipment 100 will be described in more detail with reference to FIG. 4.

The WCDMA network 101 may provide a WCDMA service to the user equipment 100 within a WCDMA service area. The WCDMA network 101 may include a node-B 110, a radio network controller (RNC) 120, a mobile switching center (MSC) 130, a home location register (HLR) 140, a serving GPRS support node (SGSN) 150, and a gateway GPRS support node (GGSN) 160.

The node-B 110 may be a base station responsible for a link, such as a radio link, between the user equipment 100 and the RNC 120. The node-B 110 may be managed by the RNC 120. The node-B 110 may function as an access point for user equipment in a UMTS terrestrial radio access network (UTRAN). For example, the node-B 110 may receive information from a physical layer of the user equipment 100 through an uplink. Further, the node-B 110 may transmit data to the user equipment 100 through a downlink.

The RNC 120 may be responsible for controlling the node-B 110. The RNC 120 may perform radio resource management and mobility management functions. For example, the RNC 120 may manage wired or wireless channels, serve as an interface between a user equipment and a core network, access a general packet radio service (GPRS) and perform system loading.

The RNC 120 may regularly transmit network information of the WCDMA network 101 to the user equipment 100 through a common channel. For example, the RNC 120 may regularly transmit a rate control message as the network information to the user equipment 100 through a downlink (DL) dedicated control channel (DCCH) using a transport format combination (TFC) control message.

The MSC 130 may be a network node for delivering primary services. For example, the MSC 130 may be responsible for routing voice calls and short message service, as well as other services. Furthermore, the MSC 130 may perform a call register procedure and interwork with other networks.

The HLR 140 may be a database containing service information and subscriber information of the user equipment 100. The HLR 140 may perform recognition registration, deletion registration, and location confirmation.

The SGSN 150 is a network node that supports the use of a general packet radio service (GPRS). The SGSN 150 may be responsible for the delivery of data packets to and from the user equipment 100 with in the service area of the WCDMA network 101. Furthermore, the SGSN 150 may manage mobility of the user equipment 100 for general packet radio service (GPRS), manage a session for a call processing procedure and a packet data transmitting/receiving process, and support authentication and billing. The SGSN 150 may also route packet data.

The GGSN 160 may manage sessions for a packet data service, route packet data, and provide an interface for coupling the WCDMA network 101 and the Internet 195. The GGSN 160 may manage the user equipment 100 entering a corresponding area of the SGSN 150 and inform the home agent 190 of a current location of the user equipment 100 when the user equipment 100 moves to the SGSN 150.

The WiBro network 102 may provide a WiBro Internet service to the user equipment 110 within a WiBro service area. The WiBro network 102 may include a radio access station (RAS) 170, an access control router (ACR) 175, and an IP network 180.

The RAS 170 may be a base station of the WiBro system. The RAS 170 may wirelessly transmit data to the user equipment 100 within the WiBro service area. The RAS 170 may have any of a number of functions, such as a low power RF/IF module function, a controller function, an OFDMA/TDD packet scheduling function, a channel multiplexing function, a MAC frame controlling function, a MAC frame modification function, a high speed traffic real-time control function, and a handoff function.

The ACR 175 may be a router that couples together a plurality of radio access stations. The ACR 175 may control the RAS 170 and route IP packets. For example, the ACR 175 may control a handoff from one radio access station to another, control a handoff to or from another access control router, route packets, access the Internet 195, and transmit and receive data through the IP network 180.

The IP network 180 may be coupled to the home agent 190, the AAA server 192, and the Internet 195 through the router 185. The IP network 180 may receive packet data from the Internet 195 and transmit the packet data to the ACR 175.

The router 185 may couple the home agent 190, the AAA server 192, and the Internet 195 to the MSC 130 and the GGSN 160 of the WCDMA system and to the IP network 180 of the WiBro system.

The home agent 190 may route data transmitted from an external device to the user equipment 100 through the Internet 195. The AAA server 192 may perform an authentication function and a billing function.

As shown in FIG. 1, the user equipment 100 may receive a WCDMA service and a WiBro service through the WCDMA network and the WiBro network respectively. The WCDMA network may be over-loaded with data traffic or the service quality of the WCDMA network may become deteriorated while the user equipment 100 is receiving the WCDMA service through the WCDMA network. Such a WCDMA network condition may be dynamically changed while the user equipment 100 is traveling within such a heterogeneous network environment. In this case, it may be possible for the user equipment 100 to perform a handoff from the WCDMA network to the WiBro network in order to seamlessly receive a corresponding service. In an embodiment of the present invention, an assigned AMR mode is obtained from network information regularly transmitted in the WCDMA network and a handoff from the WCDMA network to the WiBro network is initiated based on a bit-rate of the obtained AMR mode.

Figure 2:
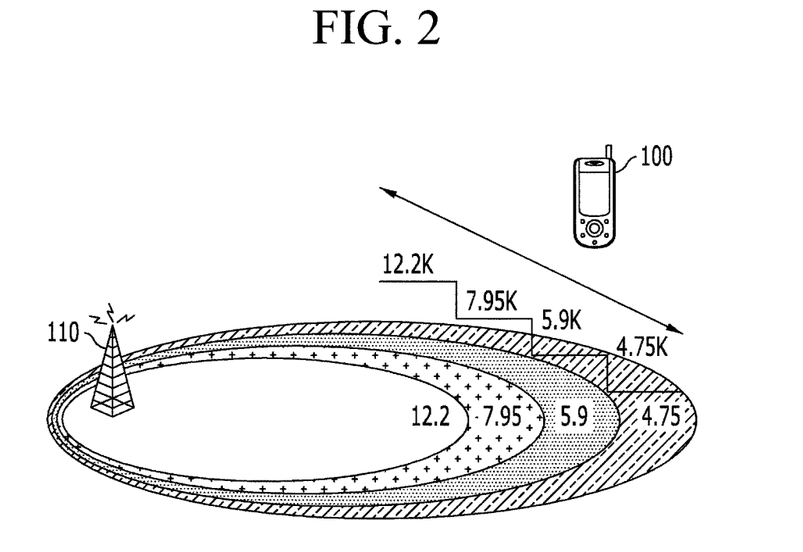
FIG. 2 illustrates adaptive multi-rate (AMR) modes, in accordance with an embodiment of the present invention.

FIG. 2 illustrates AMR modes, in accordance with an embodiment of the present invention.

The AMR may be referred to as an adaptive multi-rate audio code. The adaptive multi-rate audio code is an audio data compression scheme for speech coding that may be used in a mobile network. In the AMR, one of eight different bit-rates may be adaptively selected based on speech qualities and network conditions.

Referring to FIG. 2, four different AMR modes may be provided according to network conditions in the WCDMA network 101. In a first AMR mode, a bit-rate of 12.2K may be used for speech coding. In a second AMR mode, a bit-rate of 7.95K may be used. Bit-rates of 5.9K and 4.75K may be used for speech coding in third and fourth AMR modes respectively. Various criteria may be used for properly selecting one of the AMR modes based on a network condition of the user equipment 100. For example, the RNC 120 may select one of the AMR modes based a load condition in a corresponding cell, a transmit power (Tx) of the user equipment 100, a transmit power of the node-B 110, or a threshold assigned to each cell. In accordance with an embodiment of the present invention, the first AMR mode may be selected when the network condition or signal strength of the WCDMA network 101 is excellent. The second and third AMR modes may be selected when the network condition or the signal strength is about average. The fourth AMR mode may be selected when the network condition or the signal strength is comparatively bad. Since the network condition and signal strength typically deteriorate with increasing distance between the node-B 110 and the user equipment 100, the AMR mode may be selected according to the distance between the node-B 110 and the user equipment 100, as shown in FIG. 2.

As described above, the selected AMR mode may represent the network condition at the current location of the user equipment 100. In an embodiment of the present invention, such an AMR mode assigned for providing a corresponding service is obtained from network information transmitted through a common channel in the WCDMA network 101, and a handoff from the WCDMA network 101 to a WiBro network 102 may be initiated when a bit-rate of the obtained AMR mode is smaller than a threshold. In an embodiment of the present invention, a TFC control message may be obtained for detecting an AMR mode.

Figure 3A:
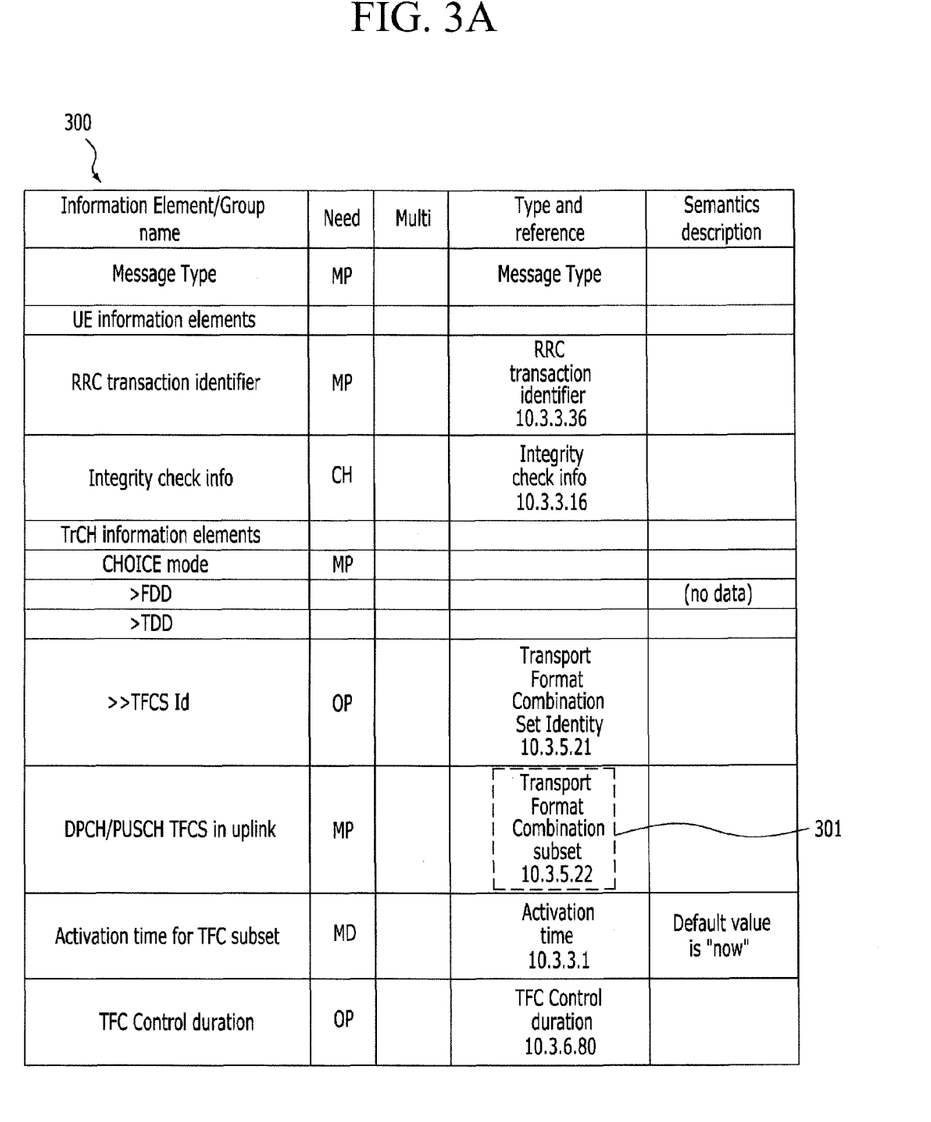
FIG. 3A illustrates a transport format combination (TFC) control message, in accordance with an embodiment of the present invention.

FIG. 3A illustrates a TFC control message, in accordance with an embodiment of the present invention.

Figure 3B:
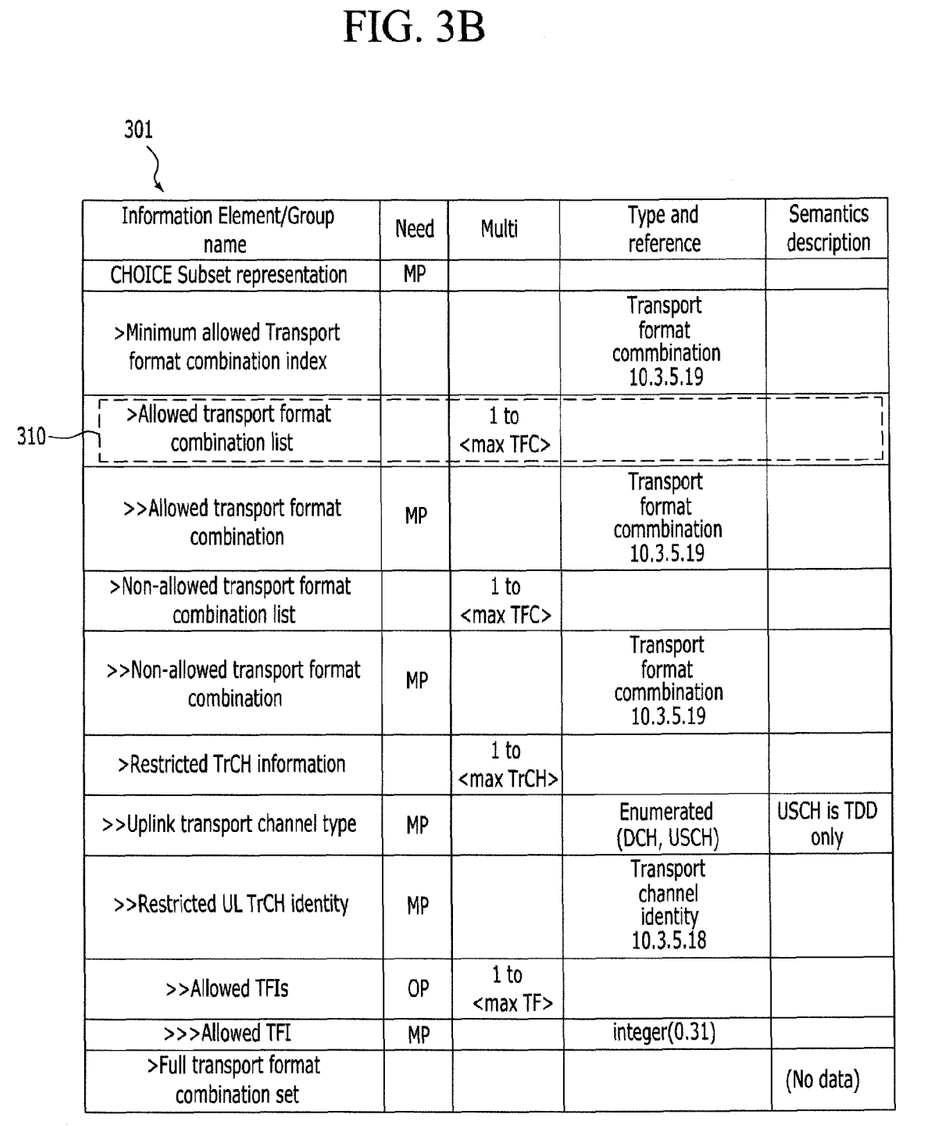
FIG. 3B illustrates a TFC subset in the TFC control message of FIG. 3A, in accordance with an embodiment of the present invention.

As shown in FIG. 3A, the TFC control message 300 may include one or more fields. Fields of the TFC control message 300 are shown in FIG. 3A in table form. In accordance with an embodiment of the present invention, the TFC control message 300 includes a TFC subset 301. The TFC control message 300 may be used to regularly transmit network information to the user equipment 100 in accordance with a third generation partnership project (3GPP) standard. For example, the RNC 120 may regularly transmit the TFC control message 300 to the user equipment 100 through a DL DCCH FIG. 3B illustrates the TFC subset of the TFC control message of FIG. 3A, in accordance with an embodiment of the present invention. Fields of the TFC subset 301 are shown in FIG. 3B in table form.

Referring to FIG. 3B, the TFC subset 301 may include a field 310 of allowed transport format combination list. The field 310 may include information of an AMR mode assigned for providing a corresponding service. For example, the field 310 may indicate one of the four AMR modes shown in FIG. 2. Each AMR mode may be associated with a bit-rate for speech coding. The user equipment 100 may determine a network condition based on a bit-rate of an AMR mode in the TFC subset 301. For example, when a bit-rate of an AMR mode included in the TFC subset 301 is the lowest bit-rate, such as 4.75K, the user equipment 100 may determine that a current network condition is poor. In this case, the user equipment 100 may automatically initiate a handoff from the WCDMA network 101 to the WiBro network 102 by turning on a processing unit for communicating with the WiBro network 102.

Figure 4:
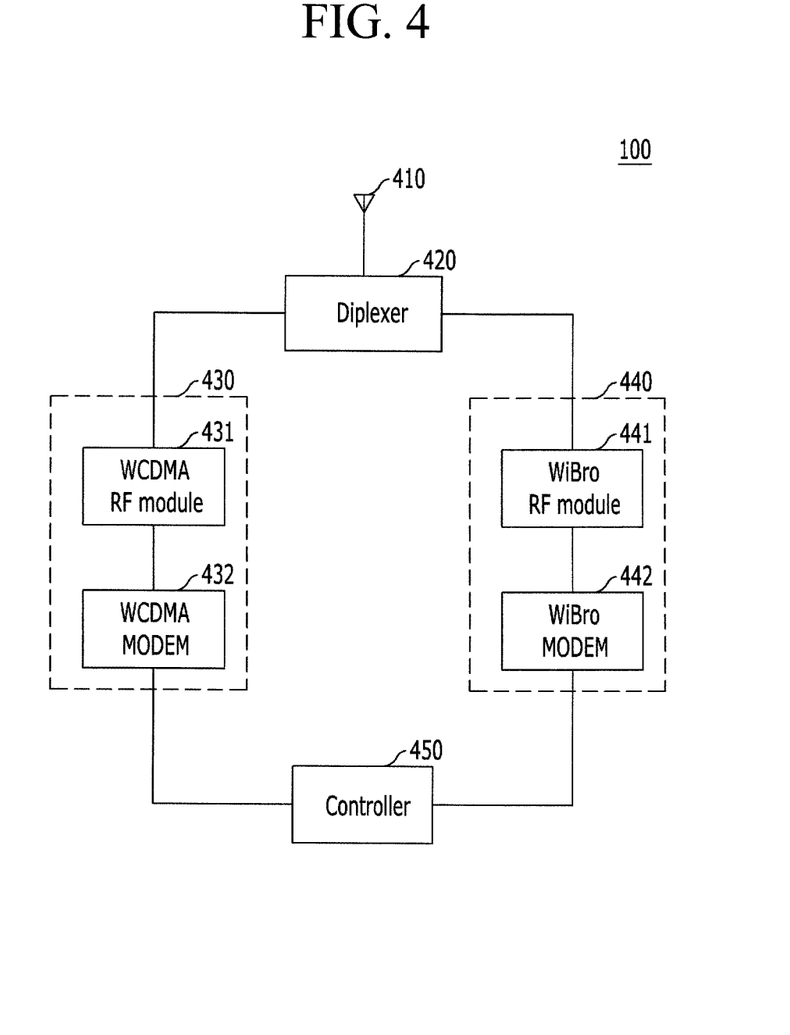
FIG. 4 illustrates in more detail the user equipment of FIG. 1, in accordance with an embodiment of the present invention.

FIG. 4 illustrates in more detail the user equipment 100 of FIG. 1, in accordance with an embodiment of the present invention.

The user equipment 100 in accordance with an embodiment of the present invention may receive network information and extract information on a network condition at a current location of the user equipment 100 from the received network information. The user equipment 100 may initiate a handoff from a first network to a second network based on the extracted information.

Referring to FIG. 4, the user equipment 100 may include an antenna 410, a diplexer 420, a WCDMA processing unit 430, a WiBro processing unit 440, and a controller 450.

The antenna 410 may transmit and receive a radio frequency (RF) signal transmitted to and from the node-B 110 or the RAS 170.

The diplexer 420 may receive a signal from the antenna, separate a WCDMA signal from the received signal, and deliver the WCDMA signal to the WCDMA processing unit 430. The diplexer 420 may also separate a WiBro signal from the received signal, and deliver the WiBro signal to the WiBro processing unit 440. Furthermore, the diplexer 420 may relay signals from the WCDMA processing unit 430 and the WiBro processing unit 440 to the antenna 410. As described above, the diplexer 420 may be a device that allows the user equipment 100 to use both a WCDMA network frequency and a WiBro network frequency. The WCDMA network frequency denotes a frequency used to communicate with the WCDMA network 101, and the WiBro network frequency denotes a frequency used to communicate with the WiBro network 102.

The WCDMA processing unit 430 may be initiated in response to a control signal from the controller 450. For example, the WCDMA processing unit 430 may be turned on or off in response to the control signal from the controller 450. After being turned on, the WCDMA processing unit 430 may start searching neighboring node-Bs and establish a communication session with a corresponding node-B.

The WCDMA processing unit 430 may include a WCDMA radio frequency (RF) module 431 and a WCDMA modulator-demodulator (MODEM) 432. The WCDMA RF module 431 may receive the WCDMA signal from the diplexer 420, extract a digital signal from the WCDMA signal using a filter, and transfer the digital signal to the WCDMA MODEM 432. The WCDMA MODEM 432 may receive the digital signal from the WCDMA RF module 431 and process the digital signal according to a protocol defined in the WCDMA network.

The WiBro processing unit 440 may be initiated in response to a control signal from the controller 450. For example, the WiBro processing unit 440 may be turned on or off in response to the control signal from the controller 450. After being turned on, the WiBro processing unit 440 may start searching neighboring radio access stations and establish a communication session with a corresponding radio access station.

The WiBro processing unit 440 may include a WiBro RF module 441 and a WiBro MODEM 442. The WiBro RF module 441 may receive the WiBro signal from the diplexer 420, extract a digital signal from the WiBro signal using a filter, and transfer the digital signal to the WiBro MODEM 442. The WiBro MODEM 442 may receive the digital signal from the WiBro RF module 441 and process the digital signal according to a protocol defined in the WiBro network.

The controller 450 may control an overall operation of the user equipment 100. The controller 350 may control the user equipment 100 to operate in one of a WCDMA mode and a WiBro mode according to the RF signal received through the antenna 410.

In an embodiment of the present invention, the controller 450 may receive network information from the RNC 120 and obtain information on a network condition at a current location of the user equipment from the received network information. The controller 450 may determine whether to initiate a handoff from the WCDMA network 101 to the WiBro network 102 based on the obtained network condition. For example, the controller 450 may receive a TFC control message as network information from the RNC 120. From the TFC control message, the controller 450 may extract information on an AMR mode selected for a current service that the user equipment 110 uses. The controller 450 may determine a bit-rate associated with the selected AMR mode. The controller 450 may determine a current network condition by comparing the bit-rate of the AMR mode with a threshold. When the current network condition of the user equipment 100 is poor, the controller 450 may initiate a handoff from the WCDMA network 101 to the WiBro network 102. Particularly, when the bit-rate of the selected AMR mode is lower than the given threshold, the controller 450 may turn on the WiBro processing unit 440 for initiating a handoff from the WCDMA network 101 to the WiBro network 102.

The user equipment 100 has been shown in FIG. 4 to include the WCDMA processing unit 430 and the WiBro processing unit 440, which may communicate with the WCDMA network 101 as the first network and the WiBro network 102 as the second network respectively. However, in other embodiments of the present invention, the WCMDA processing unit 430 may instead be another type of processing unit for communicating with a mobile or wireless data network, such as a Long Term Evolution (LTE) processing unit in which case the user equipment 100 would include a corresponding LTE RF module and LTE MODEM. Also, the WiBro processing unit 440 may instead be another type of processing unit for communicating with a mobile or wireless data network, such as a Wi-Fi processing unit in which case the user equipment 100 would include a corresponding Wi-Fi RF module and Wi-Fi MODEM, or a GSM processing unit in which case the user equipment 100 would include a corresponding GSM RF module and GSM MODEM. However, the processing unit 430 of the user equipment 100 in accordance with embodiments of the present invention is not limited to WCDMA and LTE networks, and the processing unit 440 of the user equipment 100 in accordance with embodiments of the present invention is not limited to WiBro, Wi-Fi and GSM networks, and as discussed above, the processing units 430 and 440 may each be configured to communicate with any type of communication network or standard, so long as the processing units 430 and 440 are not both configured for the same type of communication network or standard. Accordingly, the RF module and MODEM associated with each of the processing units 430 and 440 would be of types corresponding to the type of communication network or standard of the respective processing unit 430 and 440.

Figure 5:
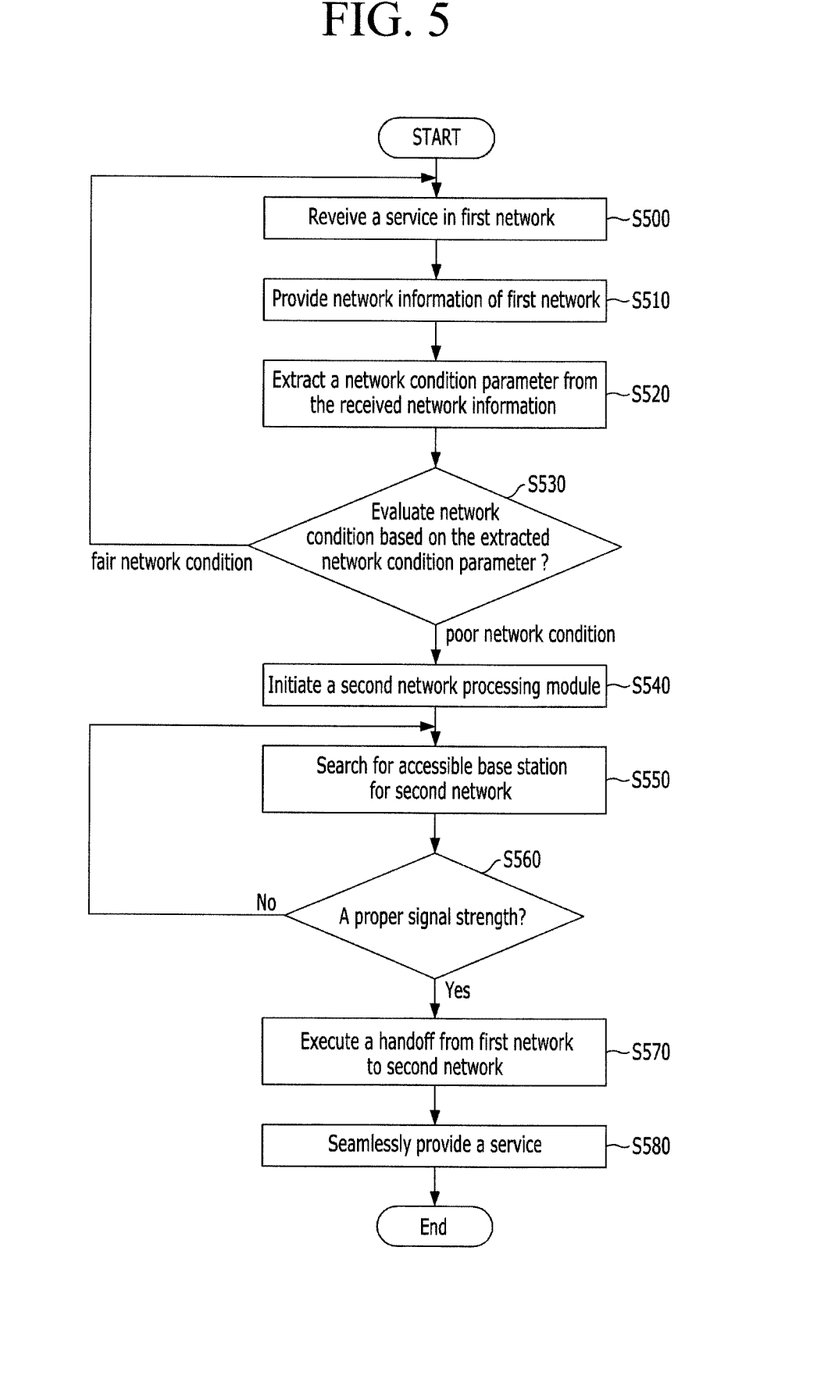
FIG. 5 illustrates a method for a handoff from a first network to a second network, in accordance with an embodiment of the present invention.

FIG. 5 illustrates a method for a handoff from a first network to a second network, in accordance with an embodiment of the present invention.

In accordance with an embodiment of the present invention, a handoff from a first network to a second network may be initiated based on a network condition for providing a service in the first network. The first network may be a mobile network, and the second network may be a wireless data network, however, the present invention is not limited thereto. The first network and the second network may each be any type of communication network or standard, so long as the first network and the second network are not of the same type.

Referring to FIG. 5, a service may be received in a communication session formed in the first network S500. The service may be a data service or a voice service. Particularly, the service may be a voice over IP (VoIP) service. For example, the user equipment 100 may receive a VoIP service in a communication session formed in the WCDMA network 101.

While receiving the service, network information may regularly be provided through a common channel of the first network S510. For example, in the case of a WCDMA network, a rate control message may be regularly transmitted as the network information through a DL DCCH using a TFC control message. Particularly, the RNC 120 may transmit a rate control message to the core network 199 in order to control a bit-rate of a downlink from the node-B 110 to the user equipment 100. The core network 199 may be a network from which the service provided to the user equipment 100 originates. In an embodiment of the present invention, the core network 199 may include the router 185, the home agent 190, the AAA server 192, and the Internet 195. The core network 199 may transmit a rate control ACK message to the RNC 120. The RNC 120 may regularly transmit a TFC control message to the user equipment 100 through the node-B 110. The user equipment 100 may transmit a TFC control ACK message to the RNC 120 through the node-B 110.

When the network information is received, a network condition parameter may be extracted from the received network information S520. The network condition parameter may indicate a current network condition for providing the service. For example, the network condition parameter may be an AMR mode assigned for providing a current service. Particularly, the user equipment 100 may extract, as the network condition parameter, an AMR mode assigned to provide a current service from the TFC control message and may detect a bit-rate of the extracted AMR mode. The bit-rate of a current AMR mode may be obtained from a TFC subset field. The current AMR mode may be one of four AMR modes each assigned with a unique bit-rate for speech coding. The assigned bit-rates may be 12.2K, 7.95K, 5.9K, and 4.75K. However, the present invention is not limited to the examples described above. In other embodiments of the present invention, the network condition parameter may be a data transmit rate for providing a current service to the user equipment. The network condition parameter may be any parameter indicating network conditions for providing a corresponding service, which is transmitted regularly to a user equipment.

The network condition for providing the service may be evaluated based on the extracted network condition parameter S530. For example, the extracted network condition parameter may be compared with a threshold. The threshold may denote a limit at which a poor network condition for providing the service in the first network exists. Particularly, the user equipment 110 may determine whether the bit-rate of the current AMR mode is smaller than the threshold. When the four AMR modes are provided, the threshold may be set to be smaller than 5.8K.

When the network condition is determined to be a poor network condition in accordance with the comparison result S530, a second network processing unit may be initiated S540. The second network processing unit may be a MODEM for the second network. For example, when the bit-rate of the current AMR mode is smaller than the threshold, the WiBro processing unit 440 may be initiated. That is, the user equipment 100 may turn on the WiBro processing unit 440.

When the network condition is determined to be a fair network condition in accordance with the comparison result S530, the service may be continuously received in the communication session formed in the first network S500. For example, the user equipment 100 may continuously receive a corresponding service in the WCDMA network when the bit-rate of the current AMR mode is larger than the threshold.

After initiating the second network processing unit, an accessible base station for the second network may be searched for S550. For example, a WiBro access point may be searched for after initiating the WiBro processing unit.

When an accessible base station for the second network is found, a determination may be made as to whether the accessible base station has a proper signal strength for providing a service S560. For example, the user equipment may determine whether or not the WiBro signal has a proper strength to provide a service.

When the accessible base station has a proper signal strength for providing a service (S560—Yes), a handoff from the first network to the second network may be executed S570. After the handoff, the service may be provided seamlessly S580. For example, when the WiBro signal has a proper strength, a handoff from the WCDMA network 101 to the WiBro network 102 may be executed. The service may be seamlessly provided to the user equipment 100 through the WiBro network 102.

When an accessible base station for the second network is not found or when the accessible base station has an improper signal strength for providing a service (S560—No), an accessible base station is searched for again S550 after a duration of time has passed. An accessible base station may not be found even after several attempts. In this case, the second network processing unit may be turned off, and the service may be continuously received through the first network.

For example, when the WiBro signal is not detected or when the WiBro signal has an improper strength, a WiBro signal is searched for again after a duration of time has passed. A WiBro signal may not be detected even after searching for several attempts. In this case, the WiBro processing unit 440 may be turned off and the service may be continuously received through the WCDMA network 101.

The method for initiating a handoff between different types of networks based on network information, in accordance with embodiments of the present invention, may be realized as a program, stored in a computer-readable recording medium such as a CD-ROM, a RAM, a ROM, floppy disks, hard disks, magneto-optical disks, and the like, and executed by a computer.

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for handing off a communication session of a user equipment from a first network to a second network, the method comprising:
    receiving, by the user equipment, a network information transmitted from the first network corresponding to a current serving network;
    determining, by the user equipment, a network condition of the first network based on an adaptive multi-rate (AMR) mode included in the received network information;
    initiating, by the user equipment, a handoff from the first network to the second network, when the network condition of the first network is determined to be poor; and
    receiving, by the user equipment, a communication service through the second network when the handoff is completed,
    wherein the determining includes:
        extracting information of the AMR mode from the received network information;
        ascertaining, from the extracted information of the AMR mode, a bit-rate associated with the AMR mode;
        comparing the ascertained bit-rate with a threshold number; and
        determining that the network condition of the first network is poor when the ascertained bit-rate is lower than or equal to the threshold number; and
    wherein the initiating includes:
        turning on a processing module for the second network when the network condition of the first network is determined to be poor;
        searching for an accessible base station of the second network, through the processing module for the second network;
        turning off the processing module for the second network, when the searching for the accessible base station of the second network does not locate the accessible base station after a predetermined number of attempts are made;
        establishing a communication session with the second network, through the processing module for the second network, when the accessible base station is found; and
        performing the handoff from the first network to the second network when the communication session with the second network is established.

2. The method of claim 1, wherein the AMR mode is assigned based on the network condition of the first network and is associated with a bit-rate for speech coding.

3. The method of claim 1, wherein the bit-rate associated with the AMR mode is one of 12.2K, 7.95K, 5.9K, and 4.75K, and the threshold number is 4.75K.

4. The method of claim 1, wherein the first network is a mobile network, and the second network is a wireless data network.

5. The method of claim 4, wherein the network information is transmitted, by a radio network controller of the first network, within a transport format combination (TFC) control message sent through a downlink (DL) dedicated control channel (DCCH).

6. The method of claim 4, wherein the AMR mode is included in an Allowed Transport Formation Combination List field in a transport format combination (TFC) subset of a TFC control message.

7. A method of performing a handoff from a mobile network to a wireless data network, the method comprising:
    receiving, by user equipment, a service in a communication session formed with the mobile network corresponding to a current serving network;
    receiving, by the user equipment, a transport format combination (TFC) control message from the mobile network;
    extracting, by the user equipment, an information of an adaptive multi-rate (AMR) mode from the received TFC control message;
    determining, by the user equipment, a network condition of the mobile network based on the extracted information of the AMR mode;

initiating, by the user equipment, the handoff from the mobile network to the wireless data network when the network condition of the mobile network is determined to be poor; and receiving, by the user equipment, the service through the wireless data network when the handoff is completed, wherein the determining includes:
ascertaining, from the extracted information of the AMR mode, a bit-rate associated with the AMR mode;
comparing the ascertained bit-rate with a threshold number; and
determining that the network condition of the mobile network is poor when the ascertained bit-rate is lower than or equal to the threshold number; and wherein the initiating includes:
turning on a processing module for the wireless data network when the network condition of the mobile network is determined to be poor;
searching for an accessible base station of the wireless data network, through the processing module for the wireless data network;
turning off the processing module for the wireless data network, when the searching for the accessible base station of the wireless data network does not locate the accessible base station after a predetermined number of attempts are made;
establishing a communication session with the wireless data network, through the processing module for the wireless data network, when the accessible base station is found; and
performing the handoff from the mobile network to the wireless data network when the communication session with the wireless data network is established.

8. The method of claim 7, wherein the AMR mode is one of a plurality of AMR modes selectively assigned for providing the service based on the network condition of the mobile network, and each AMR mode is associated with a different bit-rate for speech coding.

9. The method of claim 7, wherein the bit-rate associated with the AMR mode is one of 12.2K, 7.95K, 5.9K, and 4.75K, and the threshold number is 4.75K.

10. The method of claim 7, wherein the TFC control message is transmitted, by a radio network controller of the mobile network, through a downlink (DL) dedicated control channel (DCCH).

11. The method of claim 7, wherein the AMR mode, which is assigned based on the network condition of the mobile network and is associated with a bit-rate for speech coding, is included in an Allowed Transport Formation Combination List field in a TFC subset of the TFC control message.

12. User equipment for performing a handoff from a mobile network to a wireless data network, the user equipment comprising:
a first network processor configured to process a mobile network signal and establish a first communication session, according to a first protocol associated with the mobile network;
a second network processor configured to process a wireless data network signal and establish a second communication session, according to a second protocol associated with the wireless data network; and
a controller configured to (i) control the first and second network processors, (ii) obtain an adaptive multi-rate (AMR) mode from network information received from the mobile network corresponding to a current serving network, (iii) determine a network condition of the mobile network based on the AMR mode, (iv) initiate the handoff from the mobile network to the wireless data network when the network condition of the mobile network is determined to be poor, and (v) control the second network processor such that the user equipment receives a communication service through the wireless data network when the handoff is completed, wherein the controller is configured to perform a network condition determination procedure including:
ascertaining a bit-rate associated with the obtained AMR mode;
comparing the ascertained bit-rate with a threshold number; and
determining that the network condition of the mobile network is poor when the ascertained bit-rate is lower than or equal to the threshold number; and wherein the controller is configured to perform a handoff initiation procedure including:
turning on the second network processor when the network condition of the mobile network is determined to be poor;
controlling the second network processor to search for an accessible base station of the wireless data network;
turning off the second network processor when the searching for the accessible base station of the wireless data network does not locate the accessible base station after a predetermined number of attempts are made;
controlling the second network processor to establish the second communication session with the wireless data network when the accessible base station is found; and
performing the handoff from the mobile network to the wireless data network when the second communication session is established.

13. The user equipment of claim 12, wherein:
the network information is transmitted to the user equipment within a transport format combination (TFC) control message and through a downlink (DL) dedicated control channel (DCCH), and
the controller is configured to extract information on the AMR mode associated with the mobile network from the TFC control message.

14. The method of claim 1, wherein:
the first network is one of a wideband code division multiple access (WCDMA) network and a long term evolution (LTE) network; and
the second network is one of a wireless broadband internet (WiBro) network and a Wi-Fi network.

15. The method of claim 7, wherein:
the mobile network is one of a wideband code division multiple access (WCDMA) network and a long term evolution (LTE) network; and
the wireless data network is one of a wireless broadband internet (WiBro) network and a Wi-Fi network.

16. The user equipment of claim 12, wherein:
the mobile network is one of a wideband code division multiple access (WCDMA) network and a long term evolution (LTE) network; and
the wireless data network is one of a wireless broadband internet (WiBro) network and a Wi-Fi network.

17. The method of claim 1, wherein the threshold number is predetermined as a lowest AMR bit rate.

18. The method of claim 7, wherein the threshold number is predetermined as a lowest AMR bit rate.

19. The user equipment of claim 12, wherein the threshold number is predetermined as a lowest AMR bit rate.

* * * * *